(12) United States Patent
Kizu et al.

(10) Patent No.: US 11,485,189 B2
(45) Date of Patent: Nov. 1, 2022

(54) WEIGHT ESTIMATION DEVICE, WEIGHT ESTIMATION METHOD AND NON-TRANSITORY STORAGE MEDIUM FOR VEHICLE

(71) Applicant: AISIN CORPORATION, Aichi (JP)

(72) Inventors: Masahito Kizu, Kariya (JP); Ken Ogue, Kariya (JP); Motofumi Takahara, Kariya (JP); Toshihisa Habiro, Kariya (JP)

(73) Assignee: AISIN CORPORATION, Aichi (JP)

( * ) Notice: Subject to any disclaimer, the term of this patent is extended or adjusted under 35 U.S.C. 154(b) by 0 days.

(21) Appl. No.: 17/387,058

(22) Filed: Jul. 28, 2021

(65) Prior Publication Data
US 2022/0055436 A1   Feb. 24, 2022

(30) Foreign Application Priority Data
Aug. 19, 2020   (JP) .............................. JP2020-138798

(51) Int. Cl.
| | | |
|---|---|---|
| *B60G 17/018* | (2006.01) | |
| *B60G 17/052* | (2006.01) | |
| *B60G 17/015* | (2006.01) | |

(52) U.S. Cl.
CPC ..... *B60G 17/0523* (2013.01); *B60G 17/0155* (2013.01); *B60G 2400/252* (2013.01);
(Continued)

(58) Field of Classification Search
CPC ............ B60G 17/0523; B60G 17/0155; B60G 2400/252; B60G 2400/61; B60G 2500/2014; B60G 2500/30
(Continued)

(56) References Cited

U.S. PATENT DOCUMENTS

| 10,926,602 B2 * | 2/2021 | Hirao | .................... B60G 17/015 |
| 2011/0093166 A1 * | 4/2011 | Li | ........................ B60G 17/019 |
| | | | 701/40 |

(Continued)

FOREIGN PATENT DOCUMENTS

| JP | H04161827 A | 6/1992 |
| JP | 2015205523 A | 11/2015 |

(Continued)

*Primary Examiner* — Toan C To
(74) *Attorney, Agent, or Firm* — Buchanan Ingersoll & Rooney PC

(57) ABSTRACT

A weight estimation device for a vehicle includes a storage unit storing a weight calculation information indicating a correspondence between an internal pressure value of an air spring supporting a vehicle body and a vehicle height serving as a height of the vehicle body from a base, a measured value acquisition unit acquiring a measured internal pressure value and a measured vehicle height, an internal pressure value calculation unit calculating a corrected internal pressure value of the air spring by deducting or adding a corrected value from or to the measured internal pressure value in a case where the measured internal pressure value is greater or smaller than the internal pressure value of the weight calculation information which corresponds to the measured vehicle height, and a weight calculation unit calculating a weight of a supported body, including the vehicle body, based on the corrected internal pressure value.

6 Claims, 6 Drawing Sheets

(52) U.S. Cl.
CPC .. *B60G 2400/61* (2013.01); *B60G 2500/2014* (2013.01); *B60G 2500/30* (2013.01)

(58) Field of Classification Search
USPC ..................................................... 701/37, 38
See application file for complete search history.

(56) References Cited

U.S. PATENT DOCUMENTS

| | | | |
|---|---|---|---|
| 2015/0088379 A1* | 3/2015 | Hirao | B60G 17/08 |
| | | | 701/37 |
| 2015/0202931 A1* | 7/2015 | Honig | B60C 23/001 |
| | | | 152/416 |
| 2017/0166027 A1* | 6/2017 | Rutkowski | B60G 13/06 |
| 2017/0274723 A1* | 9/2017 | Tanaka | F15B 11/16 |
| 2018/0029432 A1* | 2/2018 | Kondo | B60G 17/0565 |
| 2018/0304717 A1* | 10/2018 | Mettrick | B60G 17/033 |
| 2018/0312018 A1* | 11/2018 | Wilson | B60C 23/00354 |
| 2020/0262265 A1 | 8/2020 | Kizu et al. | |
| 2021/0001678 A1* | 1/2021 | Koyama | B60G 17/0155 |

FOREIGN PATENT DOCUMENTS

| | | | |
|---|---|---|---|
| JP | 2015206519 A | 11/2015 | |
| JP | 2020131822 A | 8/2020 | |

\* cited by examiner

WEIGHT ESTIMATION DEVICE, WEIGHT ESTIMATION METHOD AND NON-TRANSITORY STORAGE MEDIUM FOR VEHICLE

CROSS REFERENCE TO RELATED APPLICATIONS

This application is based on and claims priority under 35 U.S.C. § 119 to Japanese Patent Application 2020-138798, filed on Aug. 19, 2020, the entire content of which is incorporated herein by reference.

TECHNICAL FIELD

This disclosure generally relates to a weight estimation device, a weight estimation method, and a non-transitory storage medium for a vehicle.

BACKGROUND DISCUSSION

A known weight estimation device for a vehicle disclosed in JP2015-205523A (hereinafter referred to as Patent reference 1) is mounted on the vehicle including air springs which configure a suspension system, the air springs supporting a vehicle body, and calculates the weight of a supported body supported by the air springs based on measured internal pressure level of the air springs. The supported body includes the vehicle body and load mounted on the vehicle body.

The correspondence or relationship between the internal pressure level of the air springs and the weight of the supported body supported by the air springs changes in response to, if any, a hysteresis of an expansion and contraction of the suspension system. That is, the correspondence or relationship between the internal pressure level of the air springs and the weight of the supported body supported by the air springs differs in cases where the suspension system is expanded and contracted. To calculate the weight of the supported body in response to such hysteresis, Patent reference 1 uses two maps for correcting the internal pressure level of the air springs in response to a case where the suspension system expands and contracts. The two maps are required to be used depending on cases when calculating the weight of the supported body supported by the air springs, and accordingly, the calculation process of the weight of the supported body is likely to be complicated.

A need thus exists for a weight estimation device, a weight estimation method, and a non-transitory storage medium for a vehicle which are not susceptible to the drawback mentioned above.

SUMMARY

According to an aspect of the disclosure, a weight estimation device for a vehicle includes a storage unit configured to store weight calculation information indicating a correspondence between an internal pressure value of an air spring supporting a vehicle body and a vehicle height serving as a height of the vehicle body from a base, a measured value acquisition unit configured to acquire a measured internal pressure value serving as a measured internal pressure value of the air spring and a measured vehicle height serving as a measured value of the vehicle height, an internal pressure value calculation unit configured to calculate a corrected internal pressure value of the air spring by deducting a corrected value from the measured internal pressure value in a case where the measured internal pressure value is greater than the internal pressure value of the weight calculation information which corresponds to the measured vehicle height, or adding the corrected value to the measured internal pressure value in a case where the measured internal pressure value is smaller than the internal pressure value of the weight calculation information which corresponds to the measured vehicle height, and a weight calculation unit configured to calculate a weight of a supported body, including the vehicle body supported by the air spring, based on the corrected internal pressure value.

According to another aspect of this disclosure, a weight estimation method operated by a weight estimation device for a vehicle which includes a storage unit configured to store weight calculation information indicating a correspondence between an internal pressure value of an air spring supporting a vehicle body and a vehicle height serving as a height of the vehicle body from a base, the weight estimation method including steps of, acquiring a measured internal pressure value serving as a measured internal pressure value of the air spring and a measured vehicle height serving as a measured value of the vehicle height, calculating a corrected internal pressure value of the air spring by deducting a corrected value from the measured internal pressure value in a case where the measured internal pressure value is greater than the internal pressure value of the weight calculation information which corresponds to the measured vehicle height, or adding the corrected value to the measured internal pressure value in a case where the measured internal pressure value is smaller than the internal pressure value of the weight calculation information which corresponds to the measured vehicle height, and calculating a weight of a supported body, including the vehicle body supported by the air spring, based on the corrected internal pressure value.

According to a further aspect of this disclosure, a non-transitory storage medium configured to function a computer of a weight estimation device for a vehicle including a storage unit configured to store weight calculation information indicating a correspondence between an internal pressure value of an air spring supporting a vehicle body and a vehicle height serving as a height of the vehicle body from a base, as, a measured value acquisition unit configured to acquire a measured internal pressure value serving as a measured internal pressure value of the air spring and a measured vehicle height serving as a measured value of the vehicle height, an internal pressure value calculation unit configured to calculate a corrected internal pressure value of the air spring by deducting a corrected value from the measured internal pressure value in a case where the measured internal pressure value is greater than the internal pressure value of the weight calculation information which corresponds to the measured vehicle height, or adding the corrected value to the measured internal pressure value in a case where the measured internal pressure value is smaller than the internal pressure value of the weight calculation information which corresponds to the measured vehicle height, and a weight calculation unit configured to calculate a weight of a supported body, including the vehicle body supported by the air spring, based on the corrected internal pressure value.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

An exemplified embodiment of the disclosure is hereunder be disclosed with reference to the drawings. A configuration of the embodiment described below, and actions and results (effects) brought by the configuration are only examples. The disclosure is available to configurations other than the configuration disclosed in the embodiment, and in that case, any effects (including derivative effects) which are obtained by the basic configuration may be obtained.

Figure 1:
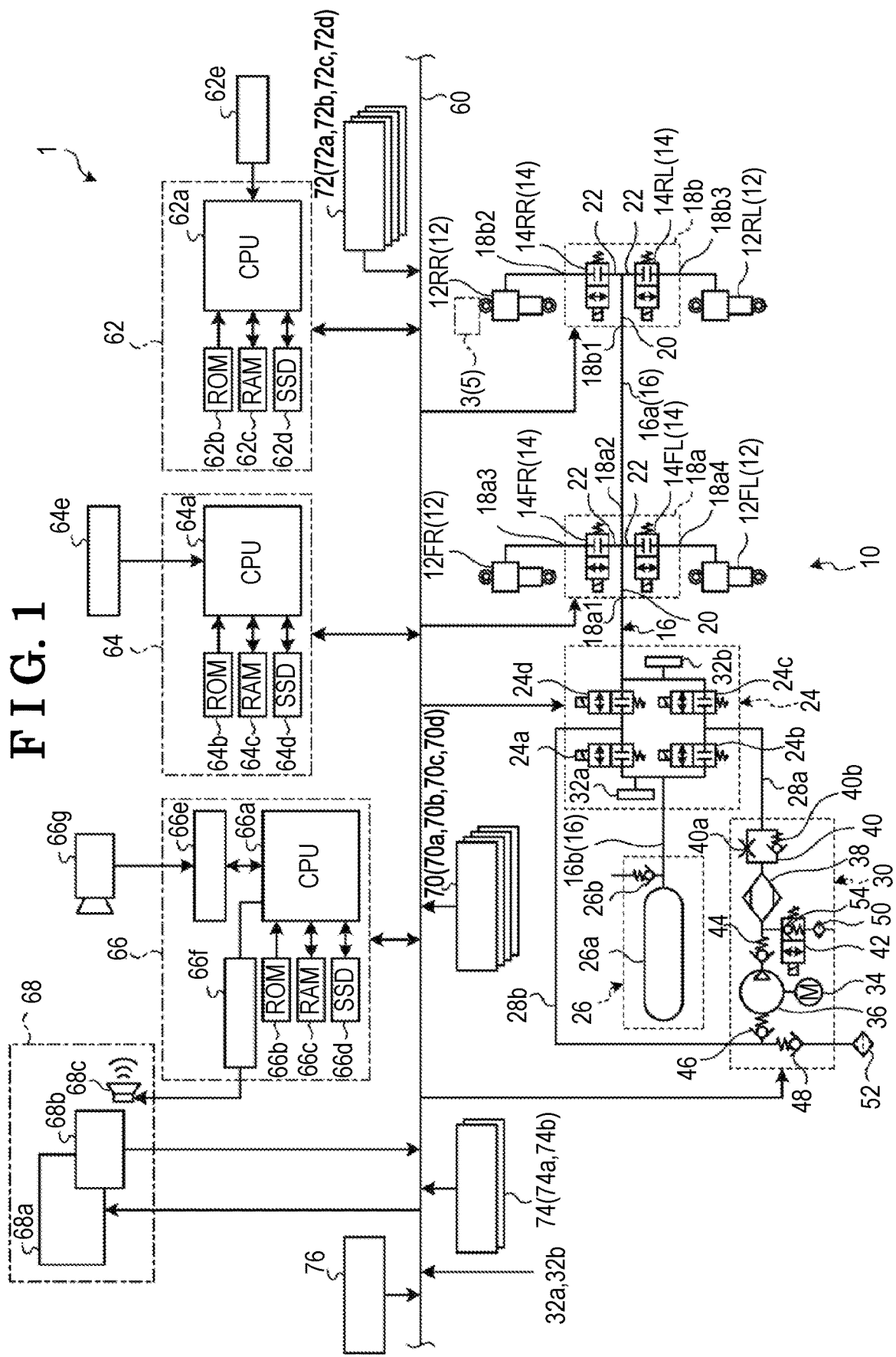
FIG. 1 is a block diagram showing an example of a vehicle according to an embodiment disclosed here.

As shown in FIG. 1, a vehicle 1 includes air springs 12FR, 12FL, 12RR, 12RL (hereinafter, also referred to as an air spring 12 when they are not distinguished with one another) which function as a vehicle-height adjustment portion. The air spring 12 is arranged between a vehicle body 3 and wheels of the vehicle 1. The air spring 12 corresponds to or configures a suspension system connecting the vehicle body 3 and the wheels. In FIG. 1, the vehicle body 3 is connected only to the air spring 12RR among the air springs 12FR, 12FL, 12RR, and 12RL, however, the vehicle body 3 is actually connected to each of the air springs 12FR, 12FL, 12RR, and 12RL.

The air spring 12 changes a suspended condition of the wheel with respect to the vehicle body 3 in response to the supply and discharge of working fluid such as air. The air spring 12 includes a function absorbing the vibration or oscillation of the vehicle 1 by an elasticity of air encapsulated in the air spring 12 in a contracted state. The air springs 12FR, 12FL each may be a front-wheel vehicle-height adjustment portion. The air springs 12RR, 12RL each may be a rear-wheel vehicle-height adjustment portion. A known structure is applicable to the air spring 12. The air spring 12 is likely to absorb subtle vibration or oscillation because of the use of the elasticity of air comparing to a metal spring. The air pressure is controlled to constantly maintain the vehicle height, to adjust the vehicle height favorably, or to change a rate of spring or a spring constant favorably.

The air springs 12FR, 12FL serving as the front-wheel vehicle-height adjustment portions are connected to a main flow path 16 where air flows via vehicle height adjustment valves 14FR, 14FL. Similarly, the air springs 12RR, 12RL serving as the rear-wheel vehicle-height adjustment portions are connected to the main flow path 16 where air flows via vehicle height adjustment valves 14RR, 14RL. The vehicle height adjustment valves 14FR, 14FL, 14RR, 14RL are also referred to as a vehicle height adjustment valve 14 in a case of being not distinguished with one another. In the embodi-ment, the air spring 12 and the vehicle height adjustment valve 14 may be correctively referred to as a vehicle-height adjustment portion.

In the embodiment, the vehicle height adjustment valves 14FR, 14FR correspond to or configure a front-wheel valve unit 18a by being embedded to a flow path block made of, for example, metal or resin. Similarly, the vehicle height adjustment valves 14RR, 14RL correspond to or configure a rear-wheel valve unit 18b by being embedded to the flow path block. Alternatively, in another embodiment, each of the vehicle height adjustment valves 14 may be individually provided. In this case, the flexibility of the layout of the vehicle height adjustment valves 14 is improved. Alternatively, the four vehicle height adjustment valves 14 may be collectively formed as a unit. In this case, the number of components may be decreased by the unification of the vehicle height adjustment valves 14.

As shown in FIG. 1, the front-wheel valve unit 18a and the rear-wheel valve unit 18b are provided separately so that the front-wheel valve unit 18a may be arranged at the front wheel. As a result, the length of a flow path pipe from the front-wheel valve unit 18a to the air spring 12 of the front wheel may be shorter than a case where all the vehicle height adjustment valves 14 are collectively formed as a unit. Similarly, the rear-wheel valve unit 18b may be arranged at the rear wheel. As a result, the length of a flow path pipe from the rear-wheel valve unit 18b to the air spring 12 of the rear wheel may be shorter than a case where all the vehicle height adjustment valves 14 are collectively formed as a unit. As a result, the arrangement of the flow path pipe may be simplified, and the risk such as a breakage of the flow path pipe may be reduced as the length of the flow path pipe is reduced.

An end surface of the front-wheel valve unit 18a includes a first port 18a1 connected with the main flow path 16, and a main flow path channel 20 is penetrated through inside the front-wheel valve unit 18a, the main flow path channel 20 including the first port 18a1 as a first end, and a second port 18a2 as a second end. Two secondary flow path channels 22 are dividedly provided, inside the front-wheel valve unit 18a, from the main flow path channel 20. A first end of the vehicle height adjustment valve 14FR is connected to one of the secondary flow path channels 22, and a second end of the vehicle height adjustment valve 14FR is connected to the air spring 12FR via a third port 18a3. Similarly, a first end of the vehicle height adjustment valve 14FL is connected to the other of the secondary flow path channels 22, and a second end of the vehicle height adjustment valve 14FL is connected to the air spring 12FL via a fourth port 18a4.

The second port 18a2 is connected with a communicating main flow path 16a (the main flow path 16). The communicating main flow path 16a is connected to a first port 18b1 of the rear-wheel valve unit 18b. The main flow path channel 20 having the first port 18b1 as the first end is formed inside the rear-wheel valve unit 18b. The two secondary flow path channels 22 are dividedly provided, inside the rear-wheel valve unit 18b, from the main flow path channel 20. A first end of the vehicle height adjustment valve 14RR is connected to one of the secondary flow path channels 22, and a second end of the vehicle height adjustment valve 14RR is connected to the air spring 12RR via a second port 18b2. A first end of the vehicle height adjustment valve 14RL is connected to the other of the secondary flow path channels 22, and a second end of the vehicle height adjustment valve 14RL is connected to the air spring 12RL via a third port 18b3.

In FIG. 1, the front-wheel valve unit 18a is a four-port type valve unit and the rear-wheel valve unit 18b is a three-port type valve unit. Alternatively, for example, a valve unit of the same four-port type may be used for the front wheels and the rear wheels. In a case where the four-port type valve unit, similarly to the front-wheel valve unit 18a, is used for the rear-wheel valve unit 18b, a plug cap (a hole cap) seals a port corresponding to the second port 18a2. In this case, the types of components and the design cost may be reduced by the commonality of the valve unit.

The vehicle height adjustment valves 14 (14FR, 14FL, 14RR, 14RL) may be the same type of an opening and closing valve, and each includes a solenoid or a spring controlled to be turned on and off. Each of the control valves may be a normally-closed electromagnetic control valve which is closed when the solenoid is in a non-energized state.

The main flow path 16 is connected to a pressure tank 26 which stores air which is in a compressed state via a circuit valve block 24 and a tank-connecting main flow path 16b. The circuit valve block 24 is connected to a discharge side of a compressor unit 30 via a compressor discharge flow path 28a. The circuit valve block 24 is connected to an introduction side of the compressor unit 30 via a compressor introduction flow path 28b. The circuit valve block 24 is configured as a valve block including plural (for example, four) opening and closing valves. Specifically, the circuit valve block 24 includes a first opening and closing valve 24a, a second opening and closing valve 24b, a third opening and closing valve 24c, and a fourth opening and closing valve 24d. First ends of the first opening and closing valve 24a and the second opening and closing valve 24b are connected to the pressure tank 26 via the tank-connecting main flow path 16b (the main flow path 16). A first end of the third opening and closing valve 24c is connected to a discharge side of the compressor unit 30 via the compressor discharge flow path 28a, and is connected to a second end of the second opening and closing valve 24b. A second end of the third opening and closing valve 24c is connected to a side of the air spring 12 (a side of the vehicle-height adjustment portion, a side of the front-wheel valve unit 18a). A first end of the fourth opening and closing valve 24d is connected to an introduction side of the compressor unit 30 via the compressor introduction flow path 28b, and is connected to a second end of the first opening and closing valve 24a. A second end of the fourth opening and closing valve 24d is connected to a side of the air spring 12 (the side of the vehicle-height adjustment portion, the side of the front-wheel valve unit 18a).

The first opening and closing valve 24a, the second opening and closing valve 24b, the third opening and closing valve 24c, and the fourth opening and closing valve 24d of the circuit valve block 24 may be the same type of the opening and closing valves, and each includes, for example, a solenoid and a spring controlled to be turned on and off. Any of the opening and closing valves may be a normally-closed electromagnetic control valve which is closed in a case where the solenoid is in a non-energized state.

The circuit valve block 24 includes a first pressure sensor 32a detecting the pressure level of the side of the pressure tank 26, and a second pressure sensor 32b detecting the pressure level of the side of the air spring 12 (the side of the vehicle-height adjustment portion, the side of the front-wheel valve unit 18a). The first pressure sensor 32a may precisely detect static pressure level of the side of the pressure tank 26 in a case where, for example, the first opening and closing valve 24a and the second opening and closing valve 24b are in the closed state. In a case where at least one of the first opening and closing valve 24a and the second opening and closing valve 24b is opened and air flows therein, the first pressure sensor 32a detects dynamic pressure level of the side of the pressure tank 26. Similarly, when the third opening and closing valve 24c and the fourth opening and closing valve 24d are closed, and at least the vehicle height adjustment valves 14FR, 14FL, 14RR, and 14RL are opened, the second pressure sensor 32b may measure the static pressure level of the side of the air spring 12. Considering a case where the third opening and closing valve 24c and the fourth opening and closing valve 24d are closed, the vehicle height adjustment valves 14RR and the 14FL are closed, and one of the vehicle height adjustment valves 14FR and the 14FL is in opened, the second pressure sensor 32b may detect the static pressure level of one of the air spring 12FR and the air spring 12FL which are arranged at the front wheels. Furthermore, because the vehicle height adjustment valves 14FR and the 14FL are opened, the second pressure sensor 32b may detect an average static pressure level of the air spring 12FR and the air spring 12FL. Considering a case where the third opening and closing valve 24c and the fourth opening and closing valve 24d are closed, the vehicle height adjustment valves 14FR and the 14FL are closed, and one of the vehicle height adjustment valves 14RR and the 14RL is opened, the second pressure sensor 32b may detect the static pressure level of one of the air spring 12RR and the air spring 12RL which are arranged at the rear wheels. Furthermore, because the vehicle height adjustment valves 14RR and the 14RL are opened, the second pressure sensor 32b may detect an average static pressure level of the air spring 12RR and the air spring 12RL. Considering a case where the third opening and closing valve 24c and the fourth opening and closing valve 24d are closed, and the vehicle height adjustment valves 14FR, 14FL, 14RR, and 14RL are opened, the second pressure sensor 32b may detect all of the static pressure level of the air spring 12FR, the air spring 12FL, the air spring 12RR, and the air spring 12RL which correspond to all the wheels. When the third opening and closing valve 24c and the fourth opening and closing valve 24d are opened, the second pressure sensor 32b may measure dynamic pressure level of the side of the air spring 12 (the side of the vehicle-height adjustment portion, the side of the front-wheel valve unit 18a and the rear-wheel valve unit 18b).

As such, the first pressure sensor 32a may detect the pressure level (the static pressure level or the dynamic pressure level) of the upstream of the circuit valve block 24 (for example, the side of the pressure tank 26), and the second pressure sensor 32b may detect the pressure level (the static pressure level or the dynamic pressure level) of the downstream of the circuit valve block 24 (for example, the side of the air spring 12). The vehicle height may be adjusted by flowing air from the side of the pressure tank 26 to the side of the air spring 12 by the difference of the pressure level between the pressure level of the side of the pressure tank 26 and the pressure level of the side of the air spring 12. In a case where the difference of the pressure level between the pressure level of the side of the pressure tank 26 and the pressure level of the side of the air spring 12 is small, air may not sufficiently flow to adjust the vehicle height. In this case, the compressor 30 operates to flow air forcibly to control the operation of each of the air springs 12.

The pressure tank 26 is made from, for example, a metal container or a resin container which stores, in a compressed state, working fluid (for example, air) supplied and discharged with respect to each of the air springs 12, and may include durability and capacity which sufficiently endure the pressure level occurred in the flow path system in a case where the vehicle height adjustment system is controlled or uncontrolled by the air springs 12. The pressure tank 26 includes a relief valve 26b for decompressing the internal pressure level of a tank body 26a in a case where the internal pressure level becomes equal to or greater than a specified pressure level (pressure level previously set by, for example, examination) by any cause.

The compressor unit 30 is configured with a restriction mechanism 40 as a main component, the restriction mechanism 40 including a compressor 36 operated by a motor 34, a dryer 38, an orifice 40a, and a check valve 40b. In FIG. 1, a relief valve 42, check valves 44, 46, 48, and filters 50, 52 are included other than the compressor 36, the dryer 38, the orifice 40a, and the check valve 40b.

The compressor unit 30 pumps air by operating the compressor 36 with the motor 34 in a case where the pressure level difference of the side of the pressure tank 26 and the side of the air spring 12 becomes equal to or lower than a predetermined value (a predetermined value specified by, for example, examination) when the vehicle height is controlled to raise, or in a case of pumping up (returning) air from the side of the air spring 12 to the pressure tank 26 when the vehicle height is controlled to be lowered. According to the embodiment, a vehicle height adjustment system 10 is a closed-type system (a vehicle height adjustment system of a closed and fast vehicle height adjustment type) adjusting the vehicle height by moving air (filled air) in the path between the side of the pressure tank 26 and the side of the air spring 12. Thus, the air spring 12 may be speedily extended, and the vehicle height may be promptly controlled in response to the situation even when the vehicle is moving. The closed-type device basically does not have to take outside air into the system, and environmental change such as humidity change is not expected to occur. Thus, the closed-type system basically does not have to include the dryer 38 and the restriction mechanism 40. However, there may be a case where air inside the system leaks out by any cause. In such case, atmosphere (outside air) is taken in from outside via the filter 52 and the check valve 48, and the air within the system is replenished. In this case, atmosphere may include moisture (humidity) which is unfavorable for components in the vehicle height adjustment system 10. Thus, the vehicle height adjustment system 10 shown in FIG. 1 includes, at the downstream of the compressor 36, the dryer 38 removing moisture included in atmosphere by a predetermined amount, and the restriction mechanism 40 for adjusting passing speed of atmosphere through the dryer 38. The compressor unit 30 includes the relief valve 42 for decompressing the vehicle height adjustment system 10 in a case where the pressure level in the vehicle height adjustment system 10 is increased beyond a limited pressure level by any cause. The relief valve 42 may be a normally-closed electromagnetic control valve including, for example, a solenoid and a spring controlled to be turned on and off, and being closed in a state where the solenoid is in a non-energized state. The relief valve 42 of the embodiment does not maintain the closed state in any cases when the solenoid is in the non-energized state, and includes a check valve 54 that allows air to flow in an opening direction of atmosphere in a case where the pressure level in the vehicle height adjustment system 10 exceeds the limited pressure level (a predetermined pressure level specified by, for example, examination). For example, in a case where the internal pressure level of the vehicle height adjustment system 10 exceeds the limited pressure level by any trouble, the check valve 54 opens against the biasing force thereof, and decompresses the vehicle height adjustment system 10 automatically to make the internal pressure level thereof be equal to or lower than the limited pressure level thereof. The relief valve 42 may be shifted to open based on a control signal from a vehicle height adjustment electronic control unit 62 or a vehicle height adjustment ECU 62, and may decompress the internal pressure level of the vehicle height adjustment system 10 regardless of the limited pressure level.

The front-wheel valve unit 18a, the rear-wheel valve unit 18b, the circuit valve block 24, and the compressor unit 30, for example, are controlled by control signals sent by the vehicle height adjustment ECU 62 which is electrically connected thereto via an internal-vehicle network 60. The internal-vehicle network 60 is configured as, for example, a controller area network or a CAN. The internal-vehicle network 60 is electrically connected with, for example, control units such as a navigation ECU 64 and a display ECU 66 other than the vehicle height adjustment ECU 62, and a monitor device 68, and sends and receives control signals and data (information) mutually.

The vehicle height adjustment ECU 62 controls, for example, the vehicle height adjustment valves 14FR, 14FL, 14RR, 14RL, the first opening and closing valve 24a, the second opening and closing valve 24b, the third opening and closing valve 24c, the fourth opening and closing valve 24d, and the relief valve 42 to open and close and the motor 34 to operate based on, for example, vehicle height adjustment requirements acquired via the internal-vehicle network 60, detection results of a vehicle height sensor 70 detecting the extension and contraction state (vehicle height state) of the air springs 12 and detection results of the first pressure sensor 32a and the second pressure sensor 32b. The vehicle height adjustment ECU 62 calculates the weight of a supported body 5 supported by the air spring 12. The supported body 5 at least includes the vehicle body 3. The supported body 5 includes a passenger when the passenger is on the vehicle body 3, and load when the load is on the vehicle body 3.

The vehicle height adjustment ECU 62 includes storage devices (storage units) such as a central processing unit 62a or a CPU 62a, a read only memory 62b or a ROM 62b, a random access memory 62c or a RAM 62c, and a solid state drive 62d or a SSD 62d serving as a flash memory. The CPU 62a reads out a program installed and stored in a non-volatile storage device such as the ROM 62b, decides the control amount of each of the above-described valves and the motor by operating the calculation process in accordance with the program, and controls the vehicle height at the wheels by extending and contracting the air springs 12. The CPU 62a operates the weight calculation process of the supported body 5 by reading out the program installed and stored in the non-volatile storage device such as the ROM 62b and operating calculation process in accordance with the program. The RAM 62c temporarily stores each of the data used in the calculation at the CPU 62a. The SSD 62d is a rewritable, non-volatile storage unit and stores data even in a case where the power of the vehicle height adjustment ECU 62 is turned off. The user may manually adjust the vehicle height by using an operation portion 62e. The operation portion 62e is for example, a press button, a toggle switch, or a rotary switch, and used in a case where the user switches the vehicle height manually when the vehicle runs on a levelled or unlevelled road, or adjusts the vehicle height in accordance with the favorability of the passenger or suitable for getting on and off the vehicle or loading and unloading load. The operation portion 62e may also switch the manual adjustment and the automatic adjustment of the vehicle height. The vehicle height adjustment ECU 62 is an example of a weight estimation device for the vehicle. The weight estimation device for the vehicle is also referred to as a weight calculation device for a vehicle.

The navigation ECU 64 includes a storage device (a storage unit) such as a CPU 64a, a ROM 64b, a RAM 64c, and a SSD 64d. The CPU 64a, for example, reads out the program installed or stored in the non-volatile storage device such as the ROM 64b, operates the calculation process in accordance with the program to acquire a current position of the vehicle, calculates a travel route from the current position to a target destination, guides a circumferential facility of the travel route, and a navigation to the target destination, based on GPS signals acquired via a GPS receiver 64e. The RAM 64c temporarily stores data used for calculation in the CPU 64a. The SSD 64d is a rewritable, non-volatile storage unit and stores date even in a case where the power of the navigation ECU 64 is turned off. The map information used for the navigation is stored in, for example, the SSD 64d, used by being read out during the navigation process or when the route is displayed, and updated in an appropriate manner to provide adequate map information. The vehicle height adjustment ECU 62 acquires the start position and the end position of the vehicle height control when the vehicle turns by using the current position of the vehicle and the map information acquired by the navigation ECU 64.

The display ECU 66 operates the image process displayed on a display device 68a of a monitor device 68. The display device 68a is a liquid crystal display or a LCD, or an organic electroluminescent display or an OELD arranged at circumference of a driver seat of the vehicle compartment, for example, on a dashboard. The display device 68a is covered with a transparent operation input portion 68b such as a touch panel. The passenger sees images displayed on a display screen of the display device 68a via the operation input portion 68b. The passenger operates the input by touching, pressing, or moving the operation input portion 68b by his/her hand or finger at the position corresponding to the image displayed on the display screen of the display device 68a. A sound output device 68c is, for example, a speaker.

The display ECU 66 includes such as a CPU 66a, a ROM 66b, a RAM 66c, a SSD 66d, a display control portion 66e, and a sound control portion 66f. The CPU 66a operates the image process relating to the image displayed on the display device 68a. The vehicle height adjustment ECU 62 creates usable information in a case where the start or end of the vehicle height adjustment is determined based on the captured image data acquired by an imaging portion 66g. The CPU 66a reads out the program installed and stored in a non-volatile storage device such as the ROM 66b, and operates calculation process in accordance the program. The RAM 66c temporarily stores data used in the calculation in the CPU 66a. The SSD 66d is a rewritable, non-volatile storage unit and stores data in a case where the power of the display ECU 66 is turned off. The display control portion 66e mainly operates composition of the image data displayed on the display device 68a among the calculation process in the display ECU 66. The sound control portion 66f mainly operates the process of the sound data outputted by the sound output device 68c among the calculation process of the display ECU 66. The monitor device 68 may be shared by, for example, the navigation system and the audio system.

In the vehicle height adjustment ECU 62, the navigation ECU 64, and the display ECU 66, the CPU 62a, the CPU 64a, the CPU 66a, the ROM 62b, the ROM 64b, the ROM 66b, the RAM 62c, the RAM 64c, and the RAM 66c, for example, may be integrally provided in the same package. Each of the ECUs may use other logic calculation processor or a logic circuit such as a digital signal processor or a DSP instead of the CPU. A hard disk drive or a HDD may be used instead of the SSD 62d, the SSD 64d, and the SSD 66d. The SSD or the HDD may be separately provided from the ECU.

In the internal-vehicle network 60, each sensor such as a vehicle height sensor 70, a wheel speed sensor 72, an acceleration sensor 74, and a steering sensor 76 are electrically connected and send and receive signals one another.

The vehicle height sensor 70 (70a, 70b, 70c, 70d) is connected to a suspension arm (such as a lower arm) configuring the suspension system per wheel, and detects the position of the vehicle body 3 in the upper lower direction with respect to the suspension arm, that is, the height of the vehicle body corresponding to the height of the vehicle body 3 with respect to the suspension arm. The suspension arm is an example of a base. The vehicle height sensor 70 may detect a displacement amount in the upper-lower direction between the suspension arm and the vehicle body 3. The vehicle height sensor 70 may be a sensor directly measuring the distance to the road surface by ultrasonic or laser. The vehicle height adjustment ECU 62 controls the extension and the contraction of the air springs 12 (12FR, 12FL, 12RR, 12RL) by controlling such as a front-wheel valve unit 18a, a rear-wheel valve unit 18b, a circuit valve block 24, and a compressor unit 30 based on the detected value of the vehicle height sensor 70. For example, in a case where the load amount or the number of passengers of the vehicle 1 changes, the vehicle height changes by the weight. However, the vehicle height of the vehicle 1 may be controlled at a substantially constant height by controlling the extension and the contraction of the air spring 12. The air spring 12 changes the vehicle height in response to the speed of the vehicle 1, and the stable movement of the vehicle in response to the speed is achieved. The air spring 12 can lower the vehicle height when the passenger gets on and off the vehicle, and can adjust the height of a loading platform when the passenger loads and unloads load. Accordingly, the passenger may easily get on and off the vehicle, and load and unload load. In a case where the road surface includes protrusions and recesses (for example, rocks, curbs, and dents), the air spring 12 may appropriately change the height of the wheels to prevent the vehicle 1 from being inclined rapidly and prevent the vehicle 1 from being unable to move because the bottom portion of the vehicle body 3 comes in contact with the road surface. The inclination control is operated by extending the air spring 12 outward in the turning direction when the vehicle 1 turns, and the vehicle 1 can be postured or oriented appropriately to turn by inclining such that the inward in the turning direction is lowered.

The wheel speed sensors 72 (72a, 72b, 72c, 72d) each is a sensor being disposed at the wheel and detecting rotary amount of the wheel or the rotation speed per unit time, and outputs the number of wheel speed pulse indicating the detected rotary speed as a detected value. The vehicle height adjustment ECU 62 calculates the speed or the moving distance of the vehicle 1 based on the detected value acquired from the wheel speed sensor 72, and operates the controls. The vehicle height adjustment ECU 62 calculates the speed of the vehicle 1 based on the detected value of the wheel speed sensor 72 (72a, 72b, 72c, 72d) by determining the speed of the vehicle 1 based on the speed of the wheel having the smallest detected value of the four wheels, and operates the controls. In a case where there is the wheel including the detected value which is the greatest among the four wheels, for example, in a case where the wheel includes the rotary speed in per unit time (per unit time or per unit distance) which is equal to or greater than the predetermined rotary speed comparing to the other wheels, the vehicle height adjustment ECU 62 determines that the wheel is in a slip state (idle state), and the controls are operated.

The vehicle height adjustment system 10 of the embodiment includes the two acceleration sensors 74 (a first acceleration sensor 74a, a second acceleration sensor 74b). The first acceleration sensor 74a is a sensor detecting, for example, the acceleration of the vehicle 1 in the right-left direction, and the second acceleration sensor 74b is a sensor detecting, for example, the acceleration of the vehicle 1 in the front-rear direction. The vehicle height adjustment ECU 62 calculates the inclination (roll angle) in the right-left direction and the inclination (pitch angle) in the front-rear direction of the vehicle 1 based on detection values of the first and second acceleration sensors 74a, 74b.

The steering sensor 76 is, for example, a sensor detecting a steering amount of a steering wheel. The vehicle height adjustment ECU 62 operates the controls by acquiring the steering amount and steering direction operated by the driver from the steering sensor 76. The vehicle height adjustment ECU 62 can calculate lateral acceleration speed functioning to the vehicle 1 based on the steering information based on the detected value of the steering sensor 76 and the vehicle speed information based on the value detected by the wheel speed sensor 72.

The vehicle height adjustment ECU 62 calculates based on the detected value of the sensors, which is not limited as above. For example, other ECU can calculate in accordance with, for example, the types of sensors or the use of the detected values.

Figure 2:
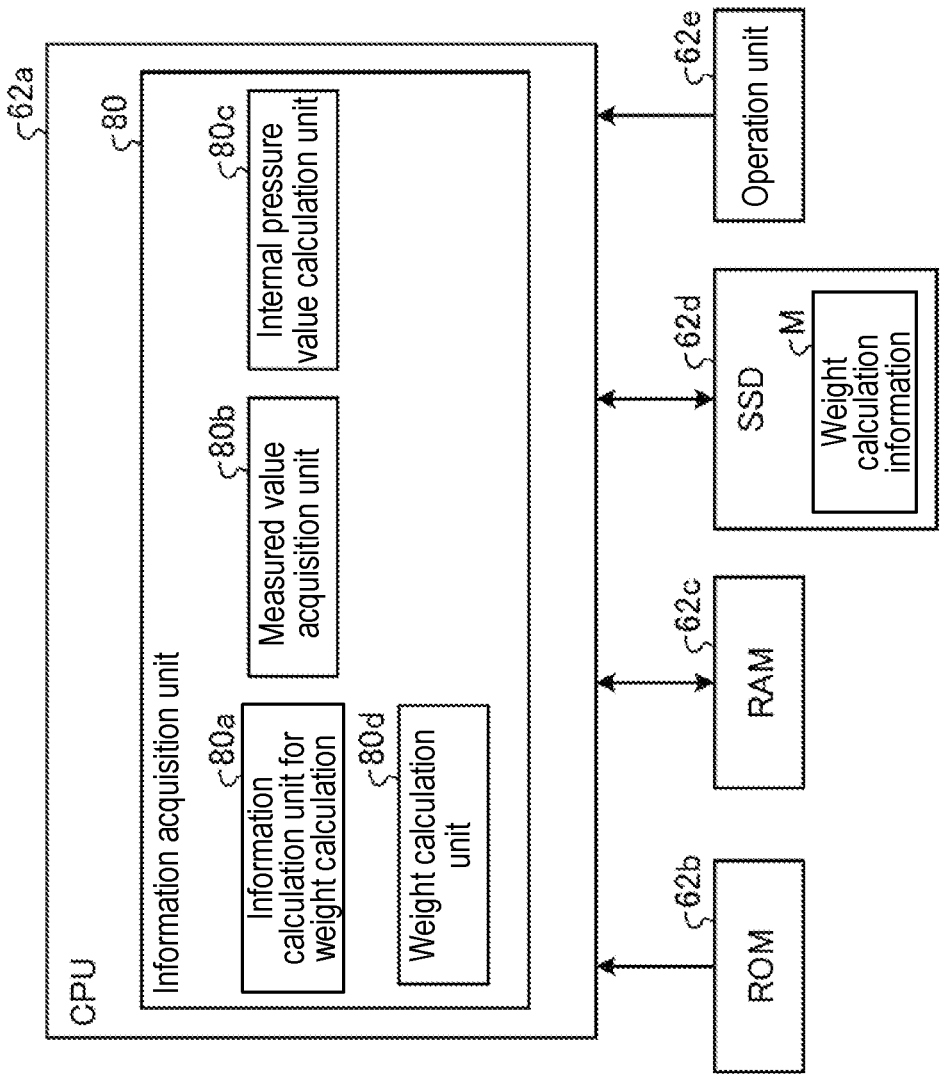
FIG. 2 is a block diagram showing an example of a module established by a CPU of a vehicle height adjustment ECU of the embodiment.

Next, the calculation of the weight of the supported body 5 operated by the vehicle height adjustment ECU 62 will hereunder be explained in detail. As shown in FIG. 2, the CPU 62a included in the vehicle height adjustment ECU 62 operates the program stored in the storage unit such as the ROM 62b to implement an information calculation unit for weight calculation 80a, a measured value acquisition unit 80b, an internal pressure value calculation unit 80c, and a weight calculation unit 80d.

The vehicle height adjustment ECU 62 calculates the weight of the supported body 5 based on a weight calculation information M stored in the SSD 62d. The weight calculation information M indicates the correspondence between the internal pressure value of the air spring 12 supporting the vehicle body 3 and a vehicle height serving as the height of the vehicle body 3 from a base (suspension arm, for example). Specifically, the weight calculation information M indicates the correspondence between the internal pressure value and the vehicle height in a state where the weight of the supported body 5 does not change from a time point in which the vehicle 1 including the vehicle body 3 stops or starts moving. That is, the weight calculation information M indicates the correspondence between the internal pressure value and the vehicle height serving as the height of the vehicle body 3 in a case where the hysteresis of the suspension system does not exist (or substantially does not exist). The weight calculation information M is previously created by the information calculation unit for weight calculation 80a before the calculation of the supported body 5. The measured value acquisition unit 80b, the internal pressure value calculation unit 80c, and the weight calculation unit 80d operate weight calculation process by using the weight calculation information M created by the information calculation unit for weight calculation 80a.

The creating method of the weight calculation information M created by the information calculation unit for weight calculation 80a will hereunder be explained with reference to FIGS. 3 and 4.

Figure 3:
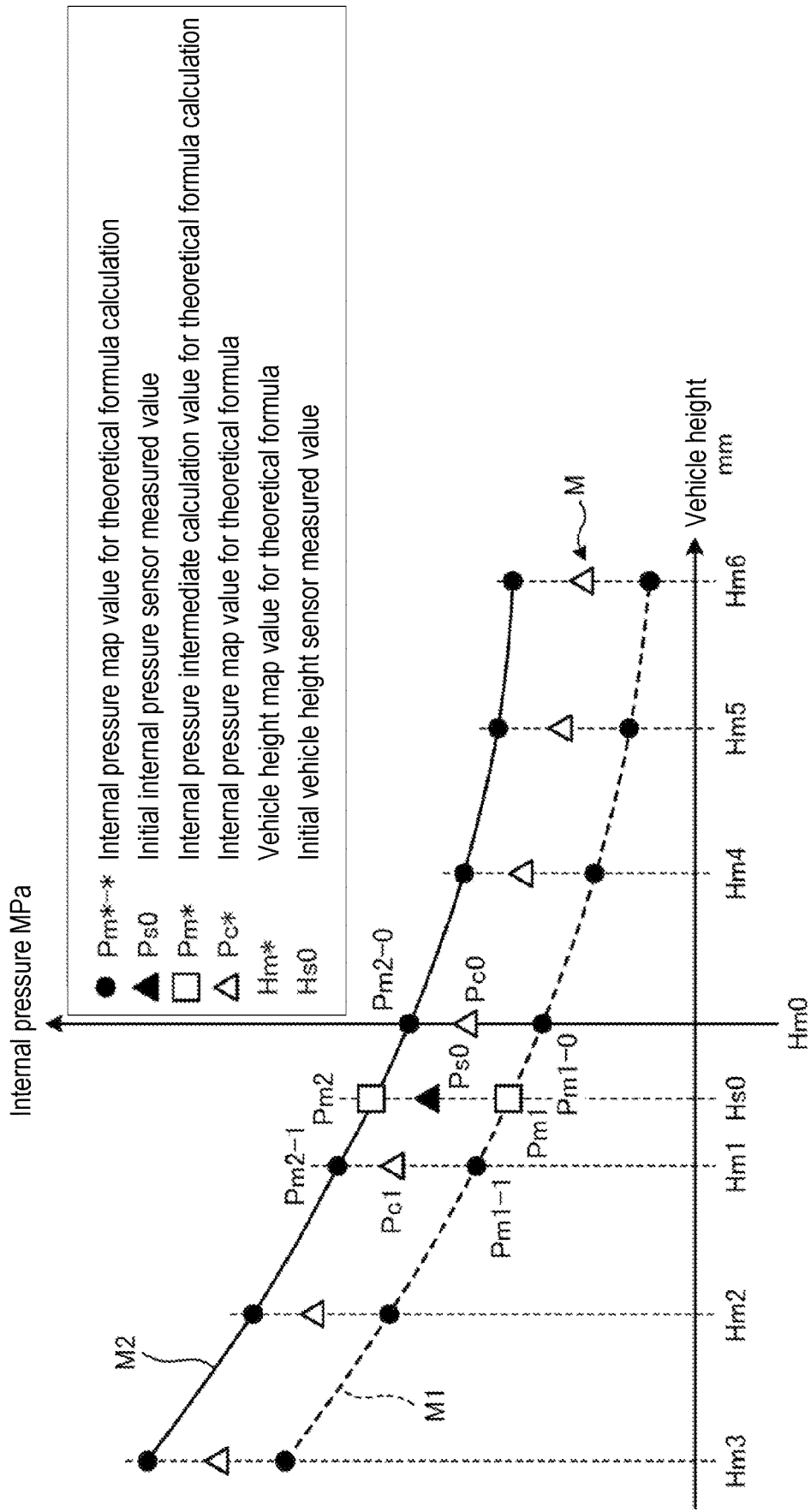
FIG. 3 is an explanatory view for explaining a creation method of weight calculation information of the embodiment.
Figure 4:
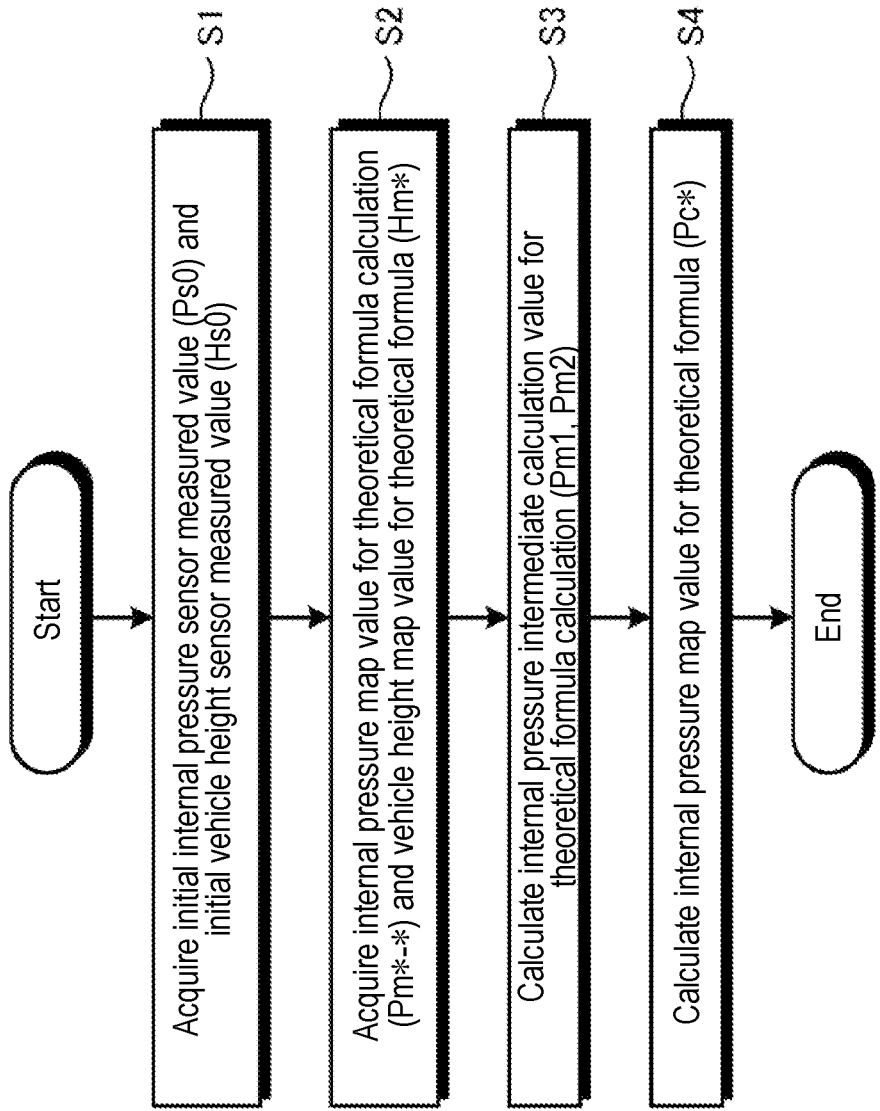
FIG. 4 is a flowchart showing an example of a creation process of the weight calculation information of the embodiment.

As shown in FIG. 3, the weight calculation information M is created based on a lowering correspondence information M1 and a raising correspondence information M2. The weight calculation information M, the lowering correspondence information M1, and the raising correspondence information M2 are map-type information.

The lowering correspondence information M1 indicates the correspondence between the internal pressure value and the vehicle height in a case where the weight of the supported body 5 changes after the vehicle height is lowered by discharging air from the air spring 12 from the time point in which the vehicle 1 stops or starts moving. The raising correspondence information M2 indicates the correspondence between the internal pressure value and the vehicle height in a case where the weight of the supported body 5 changes after the vehicle height is raised by supplying air into the air spring 12 from the time point in which the vehicle 1 stops or starts moving. Here, the movement of the vehicle 1 may be such that, for example, the wheels are rotated on a roller in an examination process of manufacturing of the vehicle 1. The weight calculation information M is also referred to as a theoretical formula map. The raising correspondence information M2 and the lowering correspondence information M1 are also referred to as theoretical formula calculation internal pressure maps.

The weight calculation information M, the lowering correspondence information M1 and the raising correspondence information M2 each includes a vehicle height map value for theoretical formula (Hm*: * is an integer) and an initial vehicle height sensor measured value (Hs0) as a map value. The weight calculation information M includes an initial internal pressure sensor measured value (Ps0) and an internal pressure map value for theoretical formula (Pc*: * is an integer) as a map value. The lowering correspondence information M1 includes a first internal pressure map value for theoretical formula calculation (Pm1-*: * is an integer) and a first internal pressure intermediate calculation value for theoretical formula calculation (Pm1) as a map value. The raising correspondence information M2 includes a second internal pressure map value for theoretical formula calculation (Pm2-* (* is an integer) and a second internal pressure intermediate calculation value for theoretical formula calculation (Pm2) as a map value.

Next, a creation process of the weight calculation information M will hereunder be explained with reference to FIG. 4. The creation process of the weight calculation information M starts at the time point at which the vehicle 1 stops or starts moving.

The information calculation unit for weight calculation 80a acquires the initial internal pressure sensor measured value (Ps0) and the initial vehicle height sensor measured value (Hs0) (Step S1). Specifically, the information calculation unit for weight calculation 80a receives the internal pressure value of the air spring 12 detected by the second pressure sensor 32b as the initial internal pressure sensor measured value (Ps0) from the second pressure sensor 32b. The information calculation unit for weight calculation 80a receives the vehicle height detected by the vehicle height sensor 70 as the initial vehicle height sensor measured value (Hs0) from the vehicle height sensor 70.

Next, the information calculation unit for weight calculation 80a acquires an internal pressure map value for theoretical formula calculation (Pm*-*) and a vehicle height map value for theoretical formula (Hm*) (Step S2). When creating the lowering correspondence information M1, the information calculation unit for weight calculation 80a acquires a first internal pressure map value for theoretical formula calculation (Pm1-*) and the vehicle height map value for theoretical formula (Hm*) in a case where the weight of the supported body 5 changes after the vehicle height is lowered by discharging air from the air spring 12 from the time point in which the vehicle 1 stops or starts moving. The weight of the supported body 5 changes by loading and unloading of load with respect to the vehicle body 3. The internal pressure map value for theoretical formula calculation (Pm*-*) is a measured value of the second pressure sensor 32b and the vehicle height map value for theoretical formula (Hm*) is a measured value of the vehicle height sensor 70. When creating the raising correspondence information M2, the information calculation unit for weight calculation 80a acquires a second internal pressure map value for theoretical formula calculation (Pm2-*) and the vehicle height map value for theoretical formula (Hm*) in a case where the weight of the supported body 5 changes after the vehicle height is raised by supplying air to the air spring 12 from the time point in which the vehicle 1 stops or starts moving. The weight of the supported body 5 changes by loading and unloading of load with respect to the vehicle body 3.

Next, the information calculation unit for weight calculation 80a calculates the first and second internal pressure intermediate calculation values for theoretical formula calculation (Pm1, Pm2) (Step S3). Pm1 and Pm2 are obtained by formulas below.

$$Pm1=((Pm1\text{-}1)-(Pm1\text{-}0))/(Hm1\text{-}Hm0)\times Hs0+(Pm1\text{-}0)$$

$$Pm2=((Pm2\text{-}1)-(Pm2\text{-}0))/(Hm2\text{-}Hm0)\times Hs0+(Pm2\text{-}0)$$

Next, the information calculation unit for weight calculation 80a calculates the internal pressure map value for theoretical formula (Pc*) (Step S4). Pc* is obtained by formulas below.

$$Pc0=((Pm2\text{-}0)-(Pm1\text{-}0))\times(Ps0\text{-}Pm1)/(Pm2\text{-}Pm1)+(Pm1\text{-}0)$$

$$Pc1=((Pm2\text{-}1)-(Pm1\text{-}1))\times(Ps0\text{-}Pm1)/(Pm2\text{-}Pm1)+(Pm1\text{-}1)$$

As above, each of Pc*s is obtained. Thus, the weight calculation information M is obtained.

Figure 5:
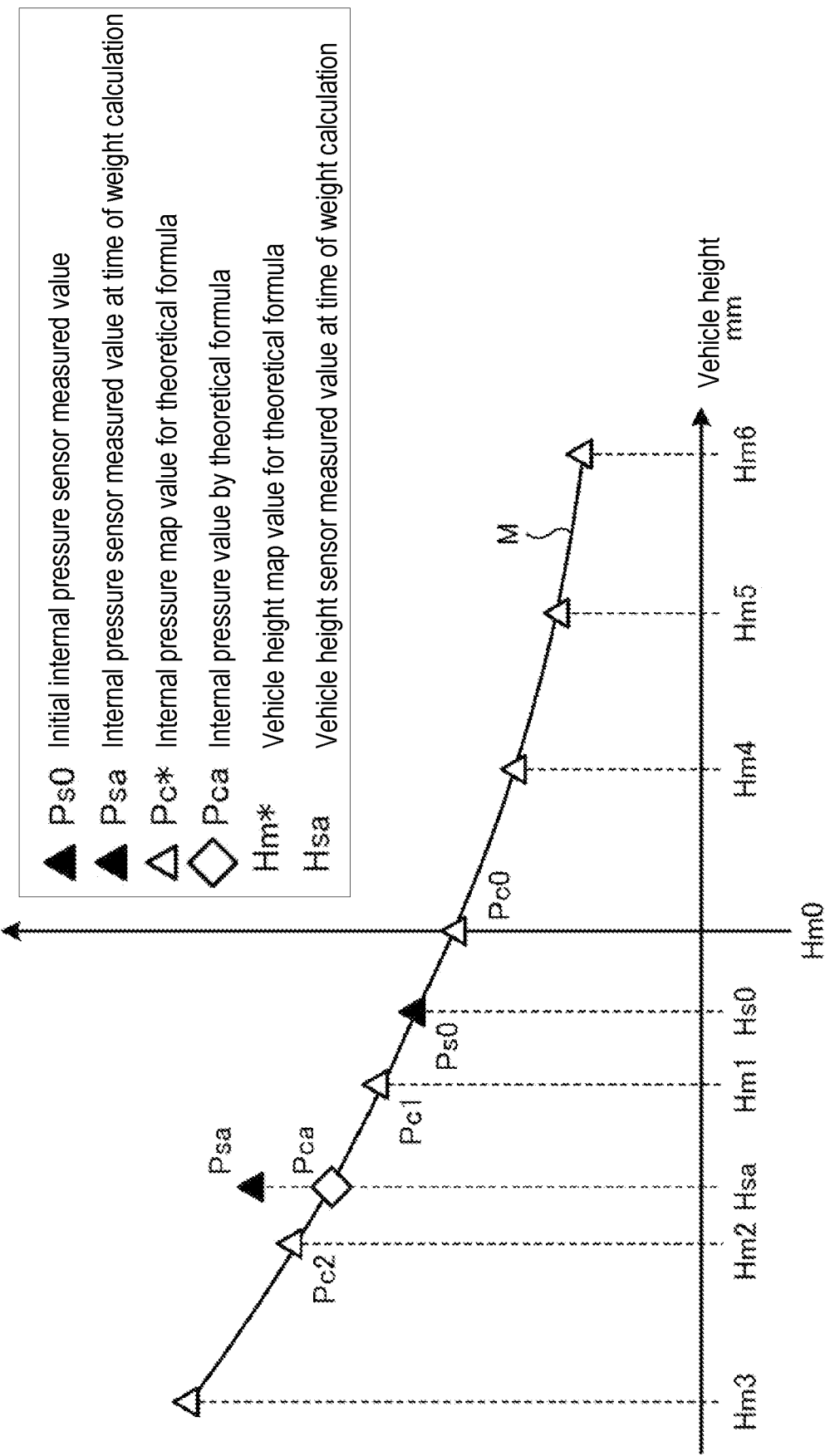
FIG. 5 is an explanatory view for explaining a weight calculation process of a supported body of the embodiment.

The measured value acquisition unit 80b, the internal pressure value calculation unit 80c and the weight calculation unit 80d operating the weight calculation process using the weight calculation information M shown in FIG. 2 will hereunder be explained with reference to FIG. 5.

The measured value acquisition unit 80b acquires an internal pressure sensor measured value at the time of weight calculation (Psa) serving as a measured internal pressure value of the air spring 12, and a vehicle height sensor measured value at the time of weight calculation (Hsa) serving as a measured value of the vehicle height. The internal pressure sensor measured value at the time of weight calculation (Psa) is an example of the measured internal pressure value, and the vehicle height sensor measured value at the time of weight calculation (Hsa) is an example of the measured vehicle height. In particular, the measured value acquisition unit 80b receives the internal pressure value of the air spring 12 detected by the second pressure sensor 32b as the internal pressure sensor measured value at the time of weight calculation (Psa) from the second pressure sensor 32b. The information calculation unit for weight calculation 80a receives the vehicle height detected by the vehicle height sensor 70 as the vehicle height sensor measured value at the time of weight calculation (Hsa) from the vehicle height sensor 70.

The internal pressure value calculation unit 80c calculates a corrected internal pressure value of the air spring 12 by subtracting a corrected value from the internal pressure sensor measured value at the time of weight calculation (Psa) in a case where the internal pressure sensor measured value at the time of weight calculation (Psa) is greater than the internal pressure value of the weight calculation information M corresponding to the vehicle height sensor measured value at the time of weight calculation (Hsa). The internal pressure value calculation unit 80c calculates a corrected internal pressure value of the air spring 12 by adding a corrected value to the vehicle height sensor measured value at the time of weight calculation (Hsa) in a case where the internal pressure sensor measured value at the time of weight calculation (Psa) is smaller than the internal pressure value of the weight calculation information M corresponding to the vehicle height sensor measured value at the time of weight calculation (Hsa). The above-described two corrected values may be the same or different. The corrected internal pressure value is also referred to as an internal pressure value after correction.

The weight calculation unit 80d calculates the weight of the supported body 5 based on the corrected internal pressure value. The weight calculation unit 80d calculates the weight of the supported body 5 based on the corrected internal pressure value in a case where the internal pressure sensor measured value at the time of weight calculation (Psa) is different from the internal pressure value corresponding to the vehicle height sensor measured value at the time of weight calculation (Hsa) and the weight calculation information M. In a case where the internal pressure sensor measured value at the time of weight calculation (Psa) is the same as the internal pressure value corresponding to the vehicle height sensor measured value at the time of weight calculation (Hsa) and the weight calculation information M, the weight calculation unit 80d calculates the weight of the supported body 5 based on the internal pressure sensor measured value at the time of weight calculation (Psa). For example, the weight calculation unit 80d calculates the weight of the supported body 5 by integrating or adding the corrected internal pressure value or the internal pressure sensor measured value at the time of weight calculation (Psa) to a predetermined pressure-receiving area of the air spring 12.

Figure 6:
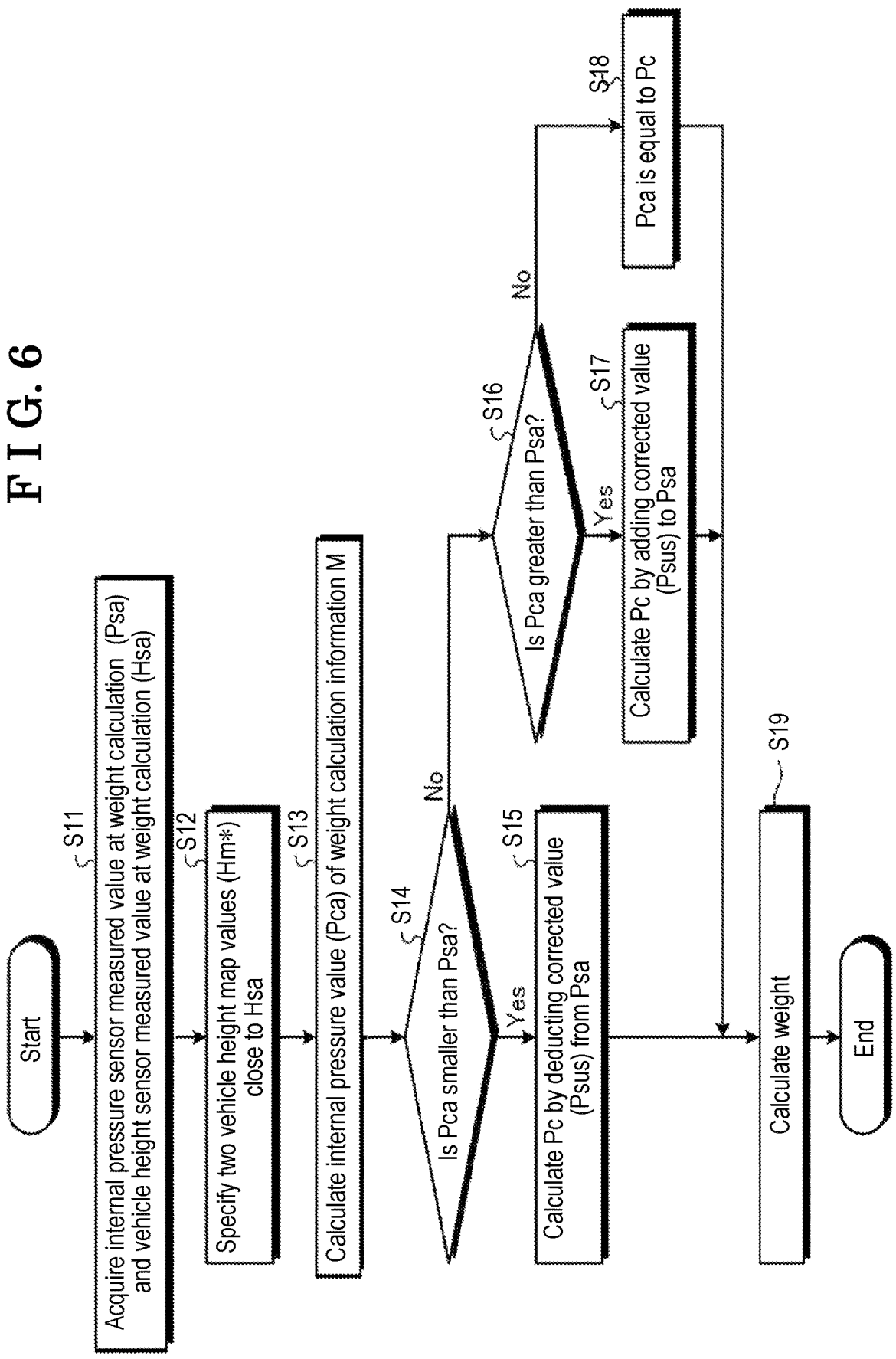
FIG. 6 is a flowchart showing an example of the weight calculation process of the supported body of the embodiment.

Next, the procedure of the weight calculation process of the supported body 5 will hereunder be explained with reference to FIG. 6.

The measured value acquisition unit 80b acquires the internal pressure sensor measured value at the time of weight calculation (Psa) and the vehicle height sensor measured value at the time of weight calculation (Hsa) (Step S11).

Next, the internal pressure value calculation unit 80c specifies (determines) the two vehicle height map values (Hm*) which are close to the vehicle height sensor measured value at the time of weight calculation (Hsa) (Step S12). In the example of FIG. 5, the two vehicle height map values are Hm1 and Hm2.

Next, the internal pressure value calculation unit 80c calculates an internal pressure value (Pca) of the weight calculation information M (Step S13). In the example of FIG. 5, the internal pressure value (Pca) is acquired by a following formula.

$$Pca=(Pc2-Pc1)/(Hm2-Hm1) \times Hsa+Pc0$$

Next, the weight calculation unit 80d determines whether the internal pressure sensor measured value at the time of weight calculation (Psa) is greater than the internal pressure value (Pca) (Step S14). In a case of determining that the internal pressure sensor measured value at the time of weight calculation (Psa) is greater than the internal pressure value (Pca) (Step S14:Yes), the weight calculation unit 80d deducts a corrected value (Psus) from the internal pressure sensor measured value at the time of weight calculation (Psa), and calculates an internal pressure value for weight calculation (Pc). The formula is: Pc=Psa−Psus.

In a case of determining that the internal pressure sensor measured value at the time of weight calculation (Psa) is not greater than the internal pressure value (Pca) (Step S14:No) and is smaller than the internal pressure value (Pca) (Step S16: Yes), the weight calculation unit 80d accumulates or adds the corrected value (Psus) to the internal pressure sensor measured value at the time of weight calculation (Psa), and calculates the internal pressure value for weight calculation (Pc) (Step S17). The formula is: Pc=Psa+Psus. Here, the corrected value (Psus) varies in response to the type of the suspension system including the air spring 12, and the weight calculation unit 80d uses the corrected value (Psus) which corresponds to the type of the suspension system. An independent suspension system includes the corrected value (Psus) which is greater than that of a rigid suspension system.

In a case where the internal pressure sensor measured value at the time of weight calculation (Psa) is not greater than the internal pressure value (Pca) (Step S14; No), not smaller than the internal pressure value (Pca) (Step S16; No), and the internal pressure sensor measured value at the time of weight calculation (Psa) is the same as the internal pressure value (Pca) (Step S18), the weight calculation unit 80d determines that the internal pressure sensor measured value at the time of weight calculation (Psa) is the internal pressure value for weight calculation (Pc). The formula is Pc=Psa (=Pca).

Next, the weight calculation unit 80d calculates the weight of the supported body 5 based on the internal pressure value for weight calculation (Pc) (Step S19).

As described above, in the embodiment, the gap between the measured value and the theoretical value (the weight calculation information M) of the internal pressure level of the air spring 12 when load is loaded or unloaded with respect to the vehicle body 3 without detecting the raising and lowering of the vehicle height is calculated (determined), and correct the gap of the internal pressure level of the air spring 12 with respect to the theoretical value caused by the hysteresis of the suspension system. Thus, comparing to a calculation method using a correction map, the weight may be highly-precisely calculated even in a case where the hysteresis of the suspension system changes due to such as the effect of the road surface. The internal pressure variation for calculating the gap from the theoretical value may not only be the internal pressure variation (MPa/mm) per unit stroke, but also the internal pressure variation (MPa/mm/sec) in which the internal pressure variation per unit stroke is divided by per unit time. The gap amount to be corrected in accordance with the required weight calculation precision may include a dead zone to inhibit hunting of the weight calculation due to subtle internal pressure variation. The lowering correspondence information M1 and the raising correspondence information M2 for calculating the theoretical value (the weight calculation information M) may be set at a free internal pressure level and a free vehicle height in accordance with the required weight calculation precision.

As described above, in the embodiment, the vehicle height adjustment ECU 62 (the weight estimation device for the vehicle) includes, for example, the SSD 62d (the storage unit), the measured value acquisition unit 80b, the internal pressure value calculation unit 80c, and the weight calculation unit 80d. The SSD 62d stores the weight calculation information M indicating the correspondence between the internal pressure value of the air spring 12 supporting the vehicle body 3 and the vehicle height serving as the height of the vehicle body 3 from the base. The measured value acquisition unit 80b acquires the measured internal pressure value serving as the measured internal pressure value of the air spring 12 and the measured vehicle height serving as the measured value of the vehicle height. The internal pressure value calculation unit 80c calculates the corrected internal pressure value of the air spring 12 by deducting the corrected value from the measured internal pressure value in a case where the measured internal pressure value is greater than the internal pressure value of the weight calculation information M which corresponds to the measured vehicle height, or adding the corrected value to the measured internal pressure value in a case where the measured internal pressure value is smaller than the internal pressure value of the weight calculation information M which corresponds to the measured vehicle height. The weight calculation unit 80d calculates the weight of the supported body 5, including the vehicle body 3 supported by the air spring 12, based on the corrected internal pressure value.

According to the aforementioned configuration, the weight of the supported body 5 is calculated by using the weight calculation information M indicating the correspondence between the internal pressure value of the air spring 12 supporting the vehicle body 3 and the vehicle height serving as the height of the vehicle body 3 from the base. Accordingly, the calculation of the weight of the supported body 5 does not have to select information which corresponds to the hysteresis of the extension and contraction of the suspension system. Thus, the calculation of the weight of the supported body 5 is inhibited from being complicated. That is, because the weight of the supported body 5 is calculated with a single type of weight calculation information M, the process is inhibited from being complicated comparing to a case where two types of weight calculation information are used.

According to the aforementioned embodiment, for example, the weight calculation unit 80d calculates the weight of the supported body 5 based on the corrected internal pressure value in a case where the measured internal pressure value is different from the internal pressure value which corresponds to the measured vehicle height and the weight calculation information M, and based on the measured internal pressure value in a case where the measured internal pressure value is the same as the internal pressure value which corresponds to the measured vehicle height and the weight calculation information M.

According to the aforementioned configuration, the weight calculation unit 80d calculates the weight of the supported body 5 based on the measured internal pressure value in a case where the measured internal pressure value is the same as the internal pressure value corresponding to the measured vehicle height and the weight calculation information M, and accordingly, the calculation process of the weight of the supported body 5 is inhibited from being complicated.

According to the aforementioned embodiment, for example, the weight calculation information M indicates the correspondence between the internal pressure value and the vehicle height in a state where the weight of the supported body 5 is unchanged from a time point in which the vehicle 1 including the vehicle body 3 stops or starts moving.

According to the aforementioned configuration, for example, the precision of the weight of the supported body may be enhanced.

According to the aforementioned embodiment, the weight calculation information M is created based on raising correspondence information M2 indicating the correspondence between the internal pressure value and the vehicle height in a case where the weight of the supported body 5 changes after the vehicle height is raised by supplying air to the air spring 12 from the time point in which the vehicle 1 including the vehicle body 3 stops or starts moving, and based on lowering correspondence information M1 indicating the correspondence between the internal pressure value and the vehicle height in a case where the weight of the supported body 5 changes after the vehicle height is lowered by discharging air from the air spring 12 from the time point in which the vehicle 1 including the vehicle body 3 stops or starts moving.

According to the aforementioned configuration, for example, the precision of the weight of the supported body may be enhanced.

In the aforementioned embodiment, the second pressure sensor 32*b* detects the pressure level of the air spring 12. Alternatively, the pressure level of the air spring 12 can be detected by a pressure sensor provided at each of the air springs 12. In this case, the pressure level used for the aforementioned weight calculation can be the average value of the output values of all the pressure sensors, or can be an output value of one of the pressure sensors.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A weight estimation device for a vehicle, comprising:
a storage unit configured to store a weight calculation information indicating a correspondence between an internal pressure value of an air spring supporting a vehicle body and a vehicle height serving as a height of the vehicle body from a base;
a measured value acquisition unit configured to acquire a measured internal pressure value serving as a measured internal pressure value of the air spring and a measured vehicle height serving as a measured value of the vehicle height;
an internal pressure value calculation unit configured to calculate a corrected internal pressure value of the air spring by
deducting a corrected value from the measured internal pressure value in a case where the measured internal pressure value is greater than the internal pressure value of the weight calculation information which corresponds to the measured vehicle height; or
adding the corrected value to the measured internal pressure value in a case where the measured internal pressure value is smaller than the internal pressure value of the weight calculation information which corresponds to the measured vehicle height; and
a weight calculation unit configured to calculate a weight of a supported body, including the vehicle body supported by the air spring, based on the corrected internal pressure value.

2. The weight estimation device for the vehicle according to claim 1, wherein the weight calculation unit is configured to calculate the weight of the supported body based on
the corrected internal pressure value in a case where the measured internal pressure value is different from the internal pressure value which corresponds to the measured vehicle height and the weight calculation information, and
the measured internal pressure value in a case where the measured internal pressure value is the same as the internal pressure value which corresponds to the measured vehicle height and the weight calculation information.

3. The weight estimation device for the vehicle according to claim 1, wherein the weight calculation information indicates the correspondence between the internal pressure value and the vehicle height in a state where the weight of the supported body is unchanged from a time point in which the vehicle including the vehicle body stops or starts moving.

4. The weight estimation device for the vehicle according to claim 1, wherein the weight calculation information is created based on;
a raising correspondence information indicating the correspondence between the internal pressure value and the vehicle height in a case where the weight of the supported body changes after the vehicle height is raised by supplying air to the air spring from a time point in which the vehicle including the vehicle body stops or starts moving; and
a lowering correspondence information indicating the correspondence between the internal pressure value and the vehicle height in a case where the weight of the supported body changes after the vehicle height is lowered by discharging air from the air spring from the time point in which the vehicle including the vehicle body stops or starts moving.

5. A weight estimation method operated by a weight estimation device for a vehicle which includes a storage unit configured to store a weight calculation information indicating a correspondence between an internal pressure value of an air spring supporting a vehicle body and a vehicle height serving as a height of the vehicle body from a base, the weight estimation method including steps of;
acquiring a measured internal pressure value serving as a measured internal pressure value of the air spring and a measured vehicle height serving as a measured value of the vehicle height;
calculating a corrected internal pressure value of the air spring by
deducting a corrected value from the measured internal pressure value in a case where the measured internal pressure value is greater than the internal pressure value of the weight calculation information which corresponds to the measured vehicle height; or adding the corrected value to the measured internal pressure value in a case where the measured internal pressure value is smaller than the internal pressure value of the weight calculation information which corresponds to the measured vehicle height; and calculating a weight of a supported body, including the vehicle body supported by the air spring, based on the corrected internal pressure value.

6. A non-transitory storage medium configured to function a computer of a weight estimation device for a vehicle including a storage unit configured to store a weight calculation information indicating a correspondence between an internal pressure value of an air spring supporting a vehicle body and a vehicle height serving as a height of the vehicle body from a base, as;

a measured value acquisition unit configured to acquire a measured internal pressure value serving as a measured internal pressure value of the air spring and a measured vehicle height serving as a measured value of the vehicle height;

an internal pressure value calculation unit configured to calculate a corrected internal pressure value of the air spring by deducting a corrected value from the measured internal pressure value in a case where the measured internal pressure value is greater than the internal pressure value of the weight calculation information which corresponds to the measured vehicle height; or adding the corrected value to the measured internal pressure value in a case where the measured internal pressure value is smaller than the internal pressure value of the weight calculation information which corresponds to the measured vehicle height; and a weight calculation unit configured to calculate a weight of a supported body, including the vehicle body supported by the air spring, based on the corrected internal pressure value.

* * * * *